Dec. 29, 1936.  W. J. MOORE  2,065,606

FISHLINE

Filed July 3, 1933

Inventor:
William J. Moore
By Fred J. Gerlach
his Atty.

Patented Dec. 29, 1936

2,065,606

UNITED STATES PATENT OFFICE 2,065,606

FISHLINE

William J. Moore, Chicago, Ill., assignor to Edward R. Goble, Chicago, Ill.

Application July 3, 1933, Serial No. 678,759

3 Claims. (Cl. 96—26)

The invention relates generally to fish lines. More particularly, the invention relates to that type of line which is adapted to be used either in trolling, bait casting or fly fishing and to have one end thereof attached to a reel on a rod and its other end connected to a lure or a fly, and comprises a core and a plurality of threads which are braided into tubular form around the core.

Heretofore, it has been customary in the manufacture of fish lines of this character to utilize silk, cotton or linen for the core and threads and it has also been customary in the use of such lines to attach the lure or fly to the outer or free end of the line by means of a gut leader because of the tendency of the line to form a shadow over the water. In practice it has been found that fish lines of silk, cotton or linen decompose with age and possess but small tensile strength in proportion to their size. It has also been found in the use of gut leaders that the gut is likely to fray during use and because of its wiriness is difficult to work with.

One object of the present invention is to provide a fish line which is tougher, lighter and more flexible than a line of silk, cotton or linen, and does not require a gut leader to connect a lure or fly to it in that it is colorless and the core and braided threads thereof are formed of minute strips of transparent or colorless "Cellophane."

Another object of the invention is to provide a fish line of the last mentioned character which has a coating of transparent varnish whereby it is rendered waterproof and kinking thereof is prevented.

A further object of the invention is to provide a fish line which is generally of new and improved construction, may be manufactured at an extremely low cost, has an extremely long life and does not have to be treated or dressed similarly to a silk line.

Other objects of the invention and the various advantages and characteristics of the present fish line construction will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views.

Figure 1:
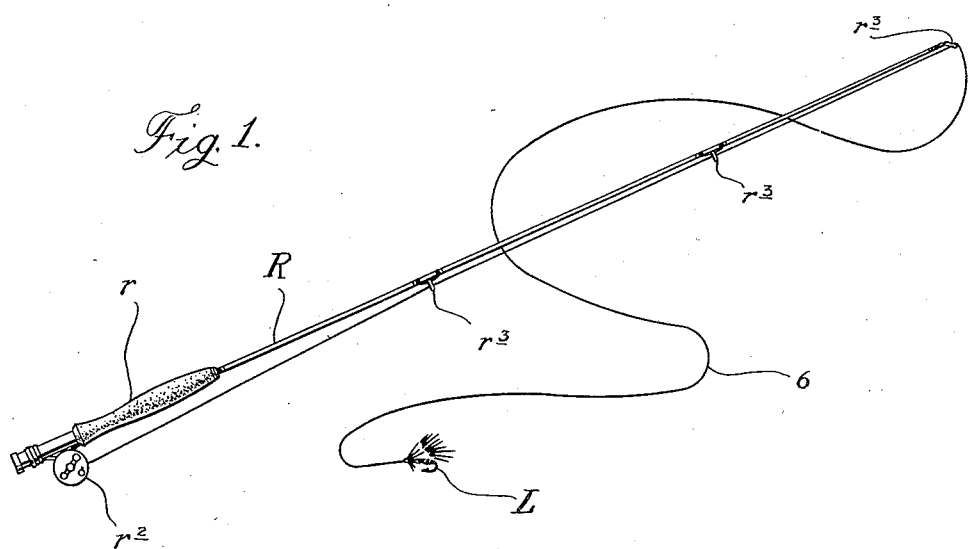
Figure 1 is a view showing a fish line embodying the invention applied to a fly rod and with a fly at the outer or free end thereof.

The fish line which forms the subject matter of the invention is adapted for use with a rod R in connection with trolling, bait casting or fly fishing. The rod R, as shown in the drawing, is of standard design and is provided with a handle $r$, a reel $r^2$ and a series of line guides $r^3$. The line extends through the guides $r^3$ and is attached at one end thereof to the spool of the reel $r^2$. The other end of the line is provided with a fly or lure L.

Figure 2:
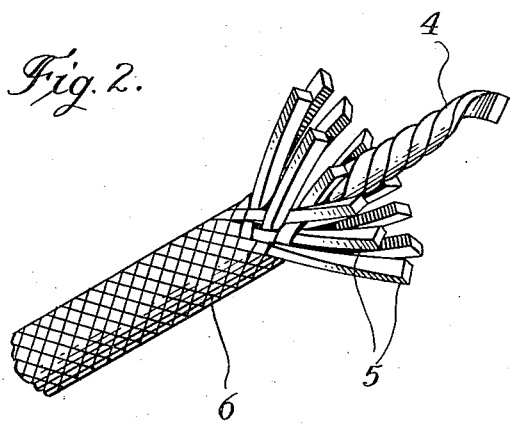
Figure 2 is an enlarged perspective of one end of the line prior to application of the varnish.
Figure 3:
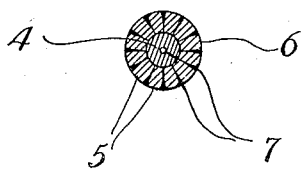
Figure 3 is an enlarged cross section of the line after application of the transparent varnish whereby the line is rendered waterproof.

The line is adapted to be wound around the reel $r^2$ in connection with fishing, as well understood in the art, and consists of a core 4 and a plurality of threads 5. The core is formed of a strip of colorless "Cellophane" or like material of the regenerated cellulose type. It is rectangular in cross section and is helically twisted so that it is substantially cylindrical, as shown in Figure 2. The threads 5 are formed of minute strips of colorless "Cellophane" or any like material having the properties and characteristics of "Cellophane" and are braided around the "Cellophane" core 4 so as to form a tubular sheath 6. They are rectangular in cross section and are preferably one sixty-fourth of an inch in width. In addition to the core 4 and the sheath 6, the line comprises a coating 7 of transparent spar varnish. This coating renders the line waterproof and serves to prevent kinking of the line during use thereof.

In fabricating the line, the "Cellophane" core 4, after being helically twisted into cylindrical form, is placed in a tubular braider and the "Cellophane" threads 5 are braided therearound. After completion of the braiding operation and the formation of the tubular sheath 6, the line is immersed in transparent spar varnish so as to acquire the waterproof coating 7. Upon hardening of this coating, the line is rubbed with pumice stone or like material so as to give it a smooth surface.

By virtue of the fact that the core 4 and the threads 5 are formed of colorless "Cellophane", the line has exceptional tensile strength and is substantially transparent or colorless. As a result of this latter characteristic or property no gut leader need be employed in connecting the fly or lure to the outer or free end of the line. The line is lighter and more flexible than a silk, cotton or linen line of the same size and leaves or unwinds from the reel of the rod to which it is applied in a free and easy manner. By applying the coating 7 of spar varnish, the line is waterproof and it is not necessary to treat or dress it like a silk line. By reason of the fact that "Cellophane" does not decompose, the line will last indefinitely except for wear.

The line is applied to the rod R similarly to a silk or cotton line and is connected directly to the lure L by tying the outer or free end thereof to the eye on the lure. If the line is to be used in connection with a fly rod for fly casting, the "Cellophane" threads 5 are preferably tapered from the center to the ends thereof so that the line is of the tapered variety.

The herein described line may be manufactured at an exceptionally low cost because of the cheapness of "Cellophane" and is extremely durable because of the tensile strength which it possesses.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. As a new article of manufacture, a colorless fish line adapted to have one of its ends connected to the reel of a fishing rod and its other end connected directly to a lure and take the place of a leader, and comprising a core in the form of a fine strip of colorless "Cellophane" type material and a sheath in the form of fine threads of colorless "Cellophane" type material braided around the core.

2. As a new article of manufacture, a fish line adapted to have one of its ends connected to the reel of a fishing rod and its other end connected directly to a lure and take the place of a leader, and comprising a core in the form of a fine twisted strip of colorless "Cellophane" type material and a sheath in the form of fine threads of colorless "Cellophane" type material braided around the core.

3. As a new article of manufacture, a colorless single length fish line adapted to have one of its ends connected to the reel of a fishing rod and its other end connected directly to a lure and take the place of a leader, and consisting of a core in the form of a fine, twisted, strip of "Cellophane" type material, a sheath in the form of fine threads of colorless "Cellophane" type material braided around the core, and a coating of spar varnish on the sheath.

WILLIAM J. MOORE.